United States Patent
Kim et al.

(10) Patent No.: US 9,717,097 B2
(45) Date of Patent: Jul. 25, 2017

(54) APPARATUS AND METHOD FOR RANDOM ACCESS BASED ON CALL PRIORITY IN A MOBILE COMMUNICATION SYSTEM

(75) Inventors: Dong-Min Kim, Seoul (KR); Young-Sung Kho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1054 days.

(21) Appl. No.: 12/808,083

(22) PCT Filed: Dec. 1, 2008

(86) PCT No.: PCT/KR2008/007090
§ 371 (c)(1),
(2), (4) Date: Jun. 14, 2010

(87) PCT Pub. No.: WO2009/075485
PCT Pub. Date: Jun. 18, 2009

(65) Prior Publication Data
US 2010/0272052 A1    Oct. 28, 2010

(30) Foreign Application Priority Data
Dec. 13, 2007 (KR) .................. 10-2007-0129979

(51) Int. Cl.
*H04W 74/00* (2009.01)
*H04W 72/02* (2009.01)
(Continued)

(52) U.S. Cl.
CPC .......... *H04W 74/008* (2013.01); *H04W 72/02* (2013.01); *H04W 72/10* (2013.01); *H04W 74/0833* (2013.01)

(58) Field of Classification Search
CPC ......... H04J 1/00; H04L 27/2647; H04M 3/00; H04M 3/5191; H04Q 7/00; H04Q 7/20; H04W 4/16; H04W 24/00; H04W 28/04; H04W 68/00; H04W 72/06; H04W 74/008; H04B 72/16
See application file for complete search history.

(56) References Cited

U.S. PATENT DOCUMENTS 4,513,413 A * 4/1985 Gorman et al. .............. 370/295
6,304,653 B1 * 10/2001 O'Neil ................ H04M 3/5191
370/352

(Continued)

FOREIGN PATENT DOCUMENTS

| KR | 1020000015422 | 3/2000 |
| KR | 1020010113524 | 12/2001 |
| WO | WO 2007/029977 | 3/2007 |

OTHER PUBLICATIONS

Written Opinion of the International Search Report Authority dated Mar. 23, 2009 (PCT/ISA/237) (5 pp.).

(Continued)

*Primary Examiner* — Andrew Lai
*Assistant Examiner* — Leon Andrews
(74) *Attorney, Agent, or Firm* — The Farrell Law Firm, P.C.

(57) ABSTRACT

Upon generation of a high-priority call, a mobile station selects a predetermined Random Access (RA) code indicating generation of a high-priority call, generates a preamble using the selected RA code, and transmits the preamble to a base station.

6 Claims, 7 Drawing Sheets (51) Int. Cl.
*H04W 72/10* (2009.01)
*H04W 74/08* (2009.01)

(56) References Cited

U.S. PATENT DOCUMENTS

| | | | |
|---|---|---|---|
| 6,317,595 B1* | 11/2001 | St. John et al. | 455/417 |
| 6,636,496 B1 | 10/2003 | Cho et al. | |
| 2005/0096021 A1* | 5/2005 | Benco et al. | 455/415 |
| 2007/0165567 A1 | 7/2007 | Tan et al. | |
| 2007/0230600 A1* | 10/2007 | Bertrand et al. | 375/260 |
| 2007/0238454 A1* | 10/2007 | Chambers | H04W 68/00 455/422.1 |
| 2008/0101313 A1* | 5/2008 | Choi | H04W 72/06 370/342 |
| 2009/0054057 A1* | 2/2009 | Goldman et al. | 455/424 |
| 2010/0272052 A1* | 10/2010 | Kim | H04W 74/008 370/329 |

OTHER PUBLICATIONS

Korean Office Action dated Oct. 27, 2014 issued in counterpart application No. 10-2008-0125967.

Korean Office Action dated Jun. 2, 2016 issued in counterpart application No. 10-2008-0125967, 6 pages.

Liu et al., "Preamble Design Based on Complete Complementary Sets for Random Access in MIMO-OFDM Systems", Wireless Communications and Networking Conference, WCNC 2007, IEEE, Mar. 11-15, 2007.

Popovic et al., "Random Access Preambles for Evolved UTRA Cellular System", 2006 IEEE Ninth International Symposium on Spread Spectrum Techniques and Applications, Aug. 2006.

* cited by examiner

APPARATUS AND METHOD FOR RANDOM ACCESS BASED ON CALL PRIORITY IN A MOBILE COMMUNICATION SYSTEM

PRIORITY

This application claims priority under 35 U.S.C. §119(a) to a Korean Patent Application filed in the Korean Intellectual Property Office on Dec. 13, 2007, assigned Serial No. 10-2007-0129979, and to PCT/KR2008/007090, filed Dec. 1, 2008, the entire disclosure of each of which is incorporated herein by reference.

BACKGROUND OF THE INVENTION

1. Field of the Invention

The present invention generally relates to a mobile communication system. More particularly, the present invention relates to an apparatus and method for establishing a call through random access between a Mobile Station (MS) and a Base Station (BS) in a mobile communication system.

2. Description of the Related Art

Today's mobile communication systems are evolving to high-speed, high-quality wireless data packet communication systems that additionally provide data service and multimedia service beyond early-stage wireless voice services. Universal Mobile Telecommunication System (UMTS), a $3^{rd}$ Generation (3G) mobile communication system that operates in Wideband Code Division Multiple Access (WCDMA) based on European mobile communication systems, Global System for Mobile Communications (GSM) and General Packet Radio Services (GPRS), provides uniform services that enable mobile phone users or computer users to transmit packet-based text, digitized audio or video, and multimedia data at or above 2 Mbps all around the world. The UMTS system adopts the access concept of packet switching using a packet protocol such as Internet Protocol (IP) and enables access to any end within a network at any time.

The $3^{rd}$ Generation Partnership Project (3GPP) working on standardization of UMTS is discussing Long Term Evolution (LTE) as the future generation of UMTS. LTE realizes packet communications at high rates, around 100 Mbps. For this purpose, many techniques have been discussed, including reduction of the number of nodes on a communication line by simplifying a network configuration and optimizing wireless protocols to radio channels.

A Radio Resource Control (RRC) state, which has been defined to distinguish User Equipment (UE) operation modes and communication states, includes an idle mode and a connected mode. A UE in the idle mode or connected mode performs an Random Access (RA) procedure in order to acquire synchronization according to UpLink (UL) timing information received from an Enhanced Node B (ENB) of an Enhanced UMTS Terrestrial Radio Access Network (E-UTRAN), to perform power control setting for initial UL transmission, or to transmit an RRC message to the ENB.

Figure 1:
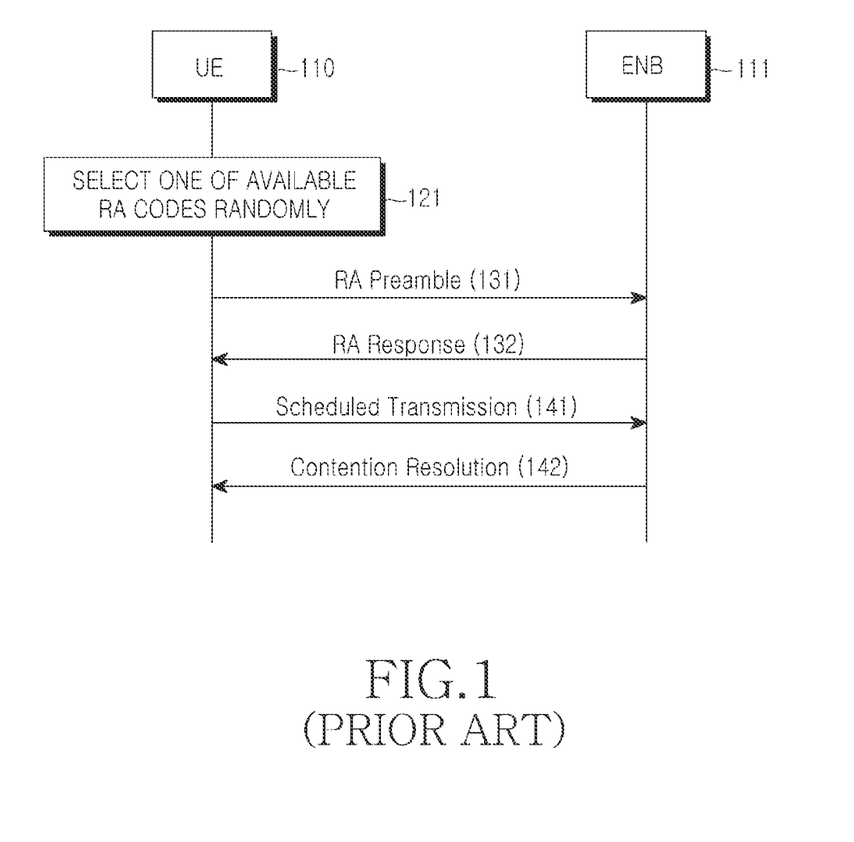
FIG. 1 illustrates a conventional RA procedure.

FIG. 1 illustrates a signal flow for an RA procedure in a conventional 3GPP E-UTRAN system.

Referring to FIG. 1, a UE 110 starts the RA procedure for a new call connection in idle mode. The UE 110 selects one of the available RA codes based on system information received from the ENB 111 in step 121 and transmits an RA Preamble based on the selected RA code to the ENB 111 in step 131. A channel for delivering the RA Preamble and a transmission time of the RA Preamble are indicated by the received system information.

The ENB 111 receives the RA Preamble, calculates a UL timing with the UE 110, and transmits an RA Response including timing synchronization information to the UE 110 so that the UE 110 can acquire UL timing synchronization in step 132. The RA Response includes code information that the ENB 111 has received in the RA Preamble and resource allocation information by which the UE 110 can perform scheduled transmission.

If the code information included in the RA Response is identical to the RA code transmitted in the RA Preamble, the UE 110 transmits a scheduled transmission message according to the resource information included in the RA Response in step 141. The scheduled transmission message is a Layer 3 RRC message, for example. In step 142, the ENB 111 transmits an RRC message to the UE 110 to establish a signaling radio bearer for exchanging Layer 3 control messages with the UE 110. If a UE Identifier (ID) included in the RRC message does not identify the UE 110, the UE 110 re-starts the RA procedure.

As described above, since the 3GPP E-UTRAN uses only an RA code in the RA procedure, the ENB has no knowledge of information about the call requested by the UE. As a result, when a preamble contention occurs among a plurality of UEs during RA, the setup of a call requiring fast call setup (e.g. an emergency call with a high priority level) is delayed.

SUMMARY OF THE INVENTION

An aspect of the present invention addresses at least the problems and/or disadvantages described above and provides at least the advantages described below. Accordingly, an aspect of the present invention is to provide an apparatus and method for reducing the connection delay of a high-priority call using preset bits of an RA Preamble in a mobile communication system.

Another aspect of the present invention provides an RA method and apparatus for reducing RA contention among MSs and efficiently using resources by allocating available resources of a BS to a high-priority call above all in a mobile communication system.

In accordance with another embodiment of the present invention, there is provided a random access method of an MS in a mobile communication system. Upon generation of a high-priority call, the MS selects a predetermined RA code indicating generation of a high-priority call, generates a preamble using the selected RA code, and transmits the preamble to a BS.

In accordance with another embodiment of the present invention, there is provided a random access method of a BS in a mobile communication system, in which the BS determines whether a preamble received from an MS includes a predetermined RA code, and allocates currently available resources to the MS with priority over other MSs, if the preamble includes the predetermined RA code.

In accordance with a further embodiment of the present invention, there is provided a random access apparatus of an MS in a mobile communication system, in which a priority decider decides a priority level of a call, upon generation of the call, an RA code generator generates a predetermined RA code indicating generation of a high-priority call, if the priority level of the call is high, a preamble generator generates a preamble using the generated RA code, and a transceiver transmits the preamble to a BS.

In accordance with still another embodiment of the present invention, there is provided a random access apparatus of a BS in a mobile communication system, in which a preamble receiver receives a preamble from an MS, a priority decider determines whether the preamble includes a predetermined RA code, and a resource manager allocates currently available resources to the MS with priority over other MSs, if the preamble includes the predetermined RA code.

BRIEF DESCRIPTION OF THE DRAWINGS

The above and other objects, features and advantages of certain embodiments of the present invention will be more apparent from the following detailed description taken in conjunction with the accompanying drawings, in which.

DETAILED DESCRIPTION OF THE PREFERRED EMBODIMENTS

The matters defined in the description such as a detailed construction and elements are provided to assist in a comprehensive understanding of preferred embodiments of the invention. Identical components illustrated in different drawings are referred to by identical reference numerals and symbols. Detailed descriptions of well-known functions and constructions are omitted for clarity and conciseness.

When a UE requests a high-priority call in a mobile communication system, the UE selects a predetermined RA code designated for requesting a high-priority call, generates a preamble using the selected RA code, and transmits the preamble to an ENB. The ENB allocates resources to the UE above all other UEs, upon determining that the UE has requested the high-priority call, if the preamble includes the predetermined RA code. While the predetermined RA code is a predetermined 6-bit sequence in an embodiment of the present invention, though the number of bits of the sequence and bit stream format may vary depending on a system in to which the present invention is incorporated.

The present invention will be described below in the context of a 3GPP LTE system based on UMTS. Yet, it is clear to those skilled in the art that the subject matter of the present invention, an RA procedure is applicable to other mobile communication systems having a similar technological background and channel configuration with slight modifications within the scope of the present invention.

Figure 2:
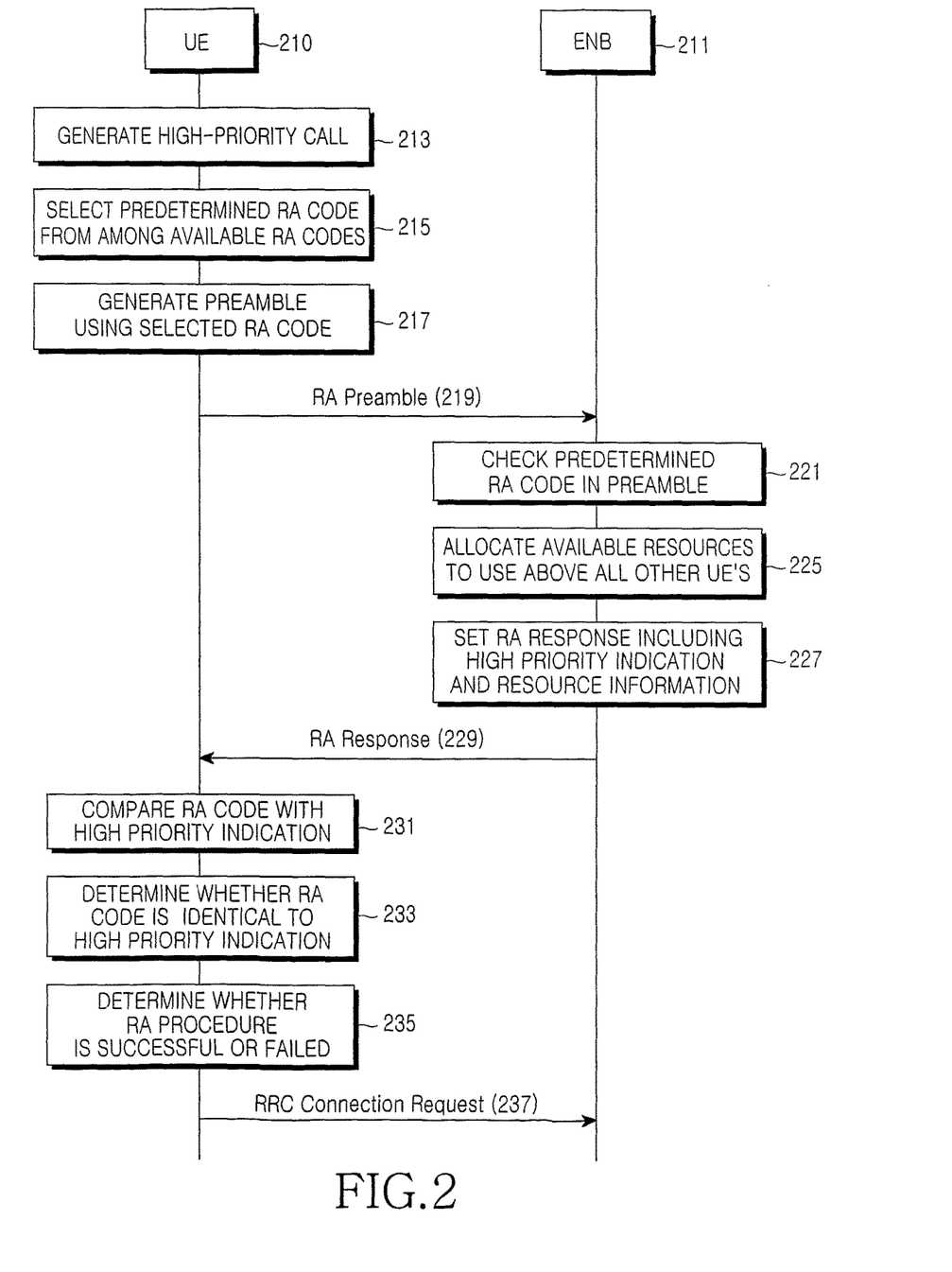
FIG. 2 is a flowchart illustrating a call setup procedure based on an RA procedure according to an embodiment of the present invention.

Referring to FIG. 2, if a UE 210 generates a high-priority call upon user request in step 213, the UE selects a predetermined RA code from among available RA codes to perform the RA procedure in step 215. In step 217, the UE 210 configures an RA Preamble using the selected RA code in step 217. Although the RA Preamble is the RA code itself, it may further include other information in addition to the RA code depending on system setting. In step 219, the UE 210 transmits the RA Preamble to an ENB 211.

Upon receipt of the RA Preamble, the ENB 211 determines whether the RA Preamble includes the predetermined RA code in step 221. When a predetermined RA code is detected, a Medium Access Control (MAC) scheduler of the ENB 211 checks available resources for RA reception and allocates the available resources to the UE 210, starting in step 225. In step 227, the ENB 211 generates an RA Response including a high priority indication and resource information about the resources allocated to the UE 210 and in step 229 transmits the RA Response to the UE 210. The high priority indication indicates that resources have been allocated to the UE 210 with priority. The high priority indication can be configured to be identical to the predetermined RA code received from the UE 210.

Upon receipt of the RA Response including the high priority indication and the resource information, the UE 210 compares the transmitted RA code with the high priority indication in step 231 and determines whether the RA code is identical to the high priority indication in step 233.

If the RA code is determined to be identical to the high priority indication in step 233, the UE 210 determines that the RA procedure is successful in step 235. If the RA code is different from the high priority indication in step 233, the UE 210 determines that the RA procedure has failed in step 235. Herein, the RA procedure is successful. Therefore, the UE 210 performs the call setup procedure by transmitting an RRC Connection Request message to the ENB 211 using the resource information included in the RA Response in step 237.

Figure 3A:
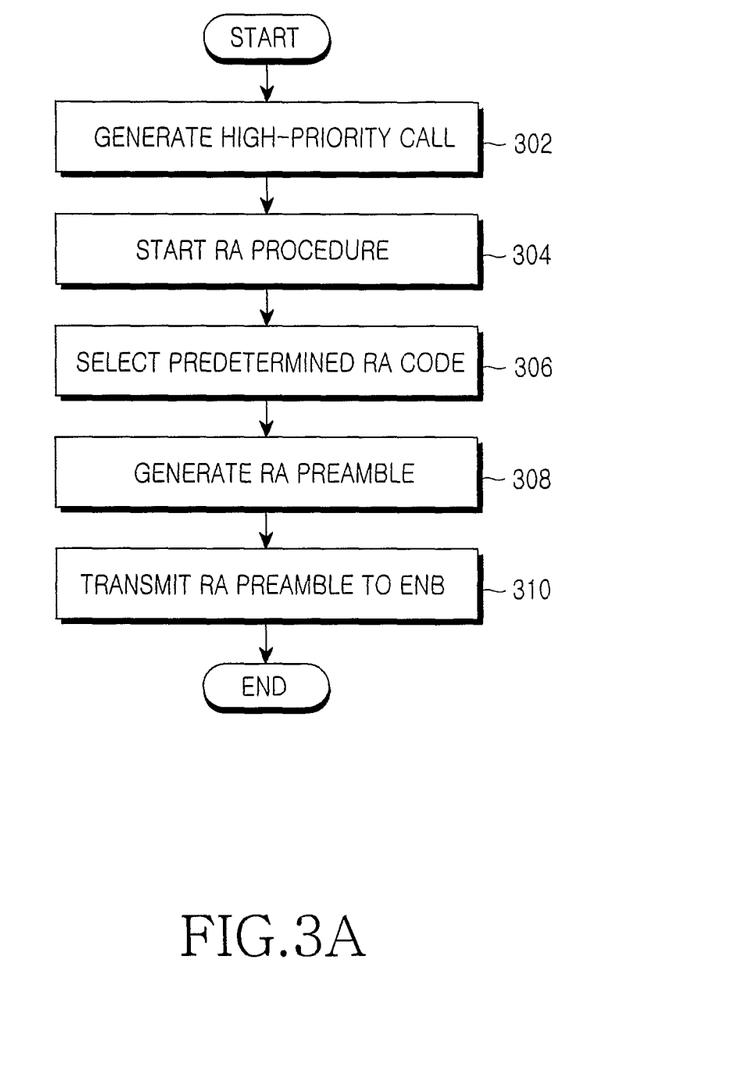
FIGS. 3A and 3B are flowcharts illustrating an RA operation of a UE according to an embodiment of the present invention.

Referring to FIG. 3A, upon generation of a high-priority call setup request as requested by a user in step 302, the UE starts an RA procedure with an ENB, for the call setup in step 304 and selects a predetermined RA code from among available RA codes to request the high-priority call in step 306. The UE generates an RA Preamble using the selected RA code in step 308 and transmits the RA preamble to the ENB in step 310.

Figure 3B:
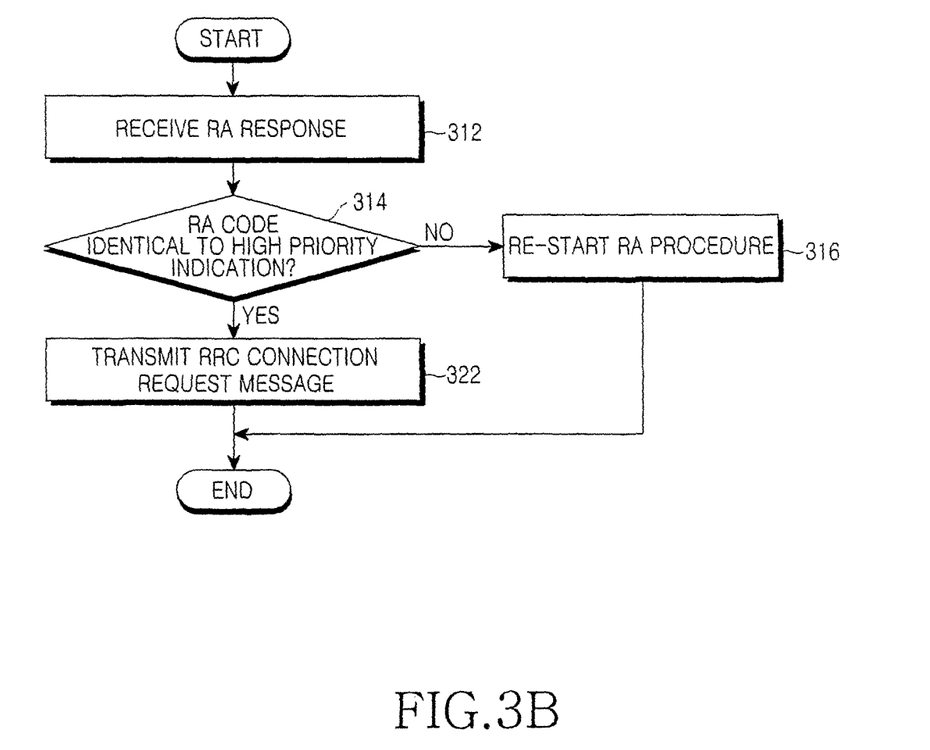

Referring to FIG. 3B, upon receipt of an RA Response from the ENB in step 312, the UE compares the transmitted RA code with a high priority indication included in the RA Response in step 314. If the RA code is different from the high priority indication, the UE restarts the RA procedure, considering that the RA procedure to have failed in step 316. If the RA code is identical to the high priority indication, the UE transmits an RRC Connection Request message to the ENB using resource information (e.g. a UL grant) included in the RA Response, considering that the RA procedure is successful in step 322.

Figure 4:
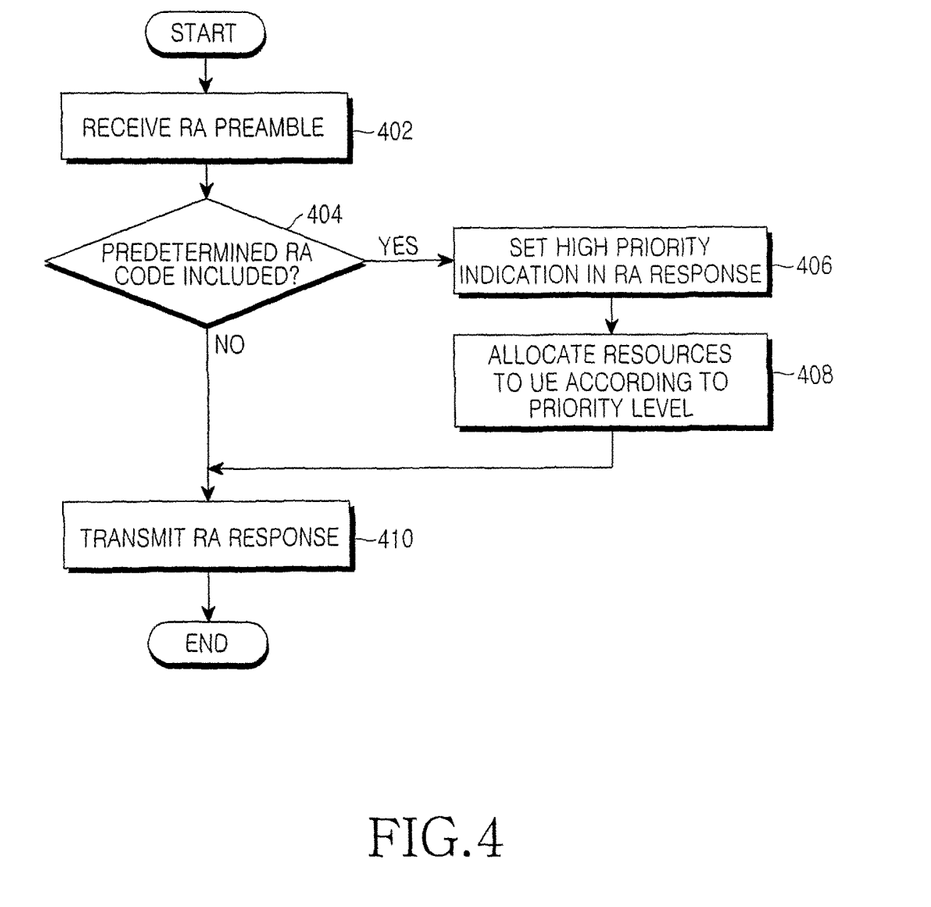
FIG. 4 is a flowchart illustrating an RA operation of an ENB according to an embodiment of the present invention.

Referring to FIG. 4, upon receipt of an RA Preamble from a UE in step 402, the ENB determines whether the RA Preamble includes a predetermined RA code in step 404. In the presence of the predetermined RA code, the ENB sets a high priority indication in step 406. The high priority indication can be set to be identical to the RA code. In step 408, the ENB allocates available resources to the UE, above all other UEs. The ENB transmits an RS Response including the high priority indication and resource information about the allocated resources to the UE in step 410.

On the other hand, in the absence of the predetermined RA code in the RA Preamble in step 404, the ENB allocates available resources to the UE like other UEs in a conventional manner, considering that the call requested by the UE is a typical call in step 410. Therefore, the ENB transmits a conventional RA Response to the UE in step 410.

Figure 5:
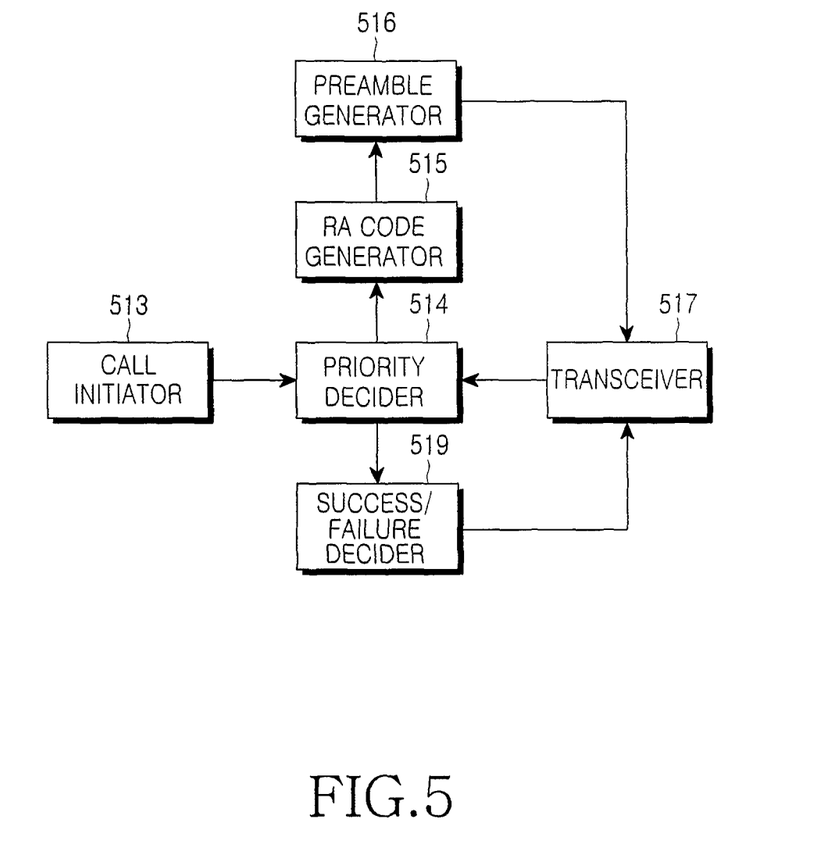
FIG. 5 is a block diagram of a UE apparatus according to an embodiment of the present invention.

Referring to FIG. 5, a call initiator 513 initiates a call upon user request. A priority decider 514 determines the priority level of the call by analyzing the user request and transmits information about the decided priority level to an RA code generator 515. The RA code generator 515 generates a predetermined RA code among available RA codes, if the priority level information indicates a high priority level. A preamble generator 516 generates an RA Preamble according to the RA code received from the RA code generator 515. A transceiver 517 transmits the RA Preamble received from the preamble generator 516 to an ENB.

Meanwhile, the transceiver 517 receives an RA Response from the ENB and provides the RA Response to the priority decider 514. The priority decider 514 compares a high priority indication included in the RA Response with the transmitted RA code and notifies a success/failure decider 519 of the comparison result. The success/failure decider 519 determines whether the RA procedure has been successful or has failed according to the comparison result and notifies the transceiver 517 whether a UL signaling message is to be transmitted. The transceiver 517 transmits an RRC Connection Request message to the ENB under the control of the success/failure decider 519.

Figure 6:
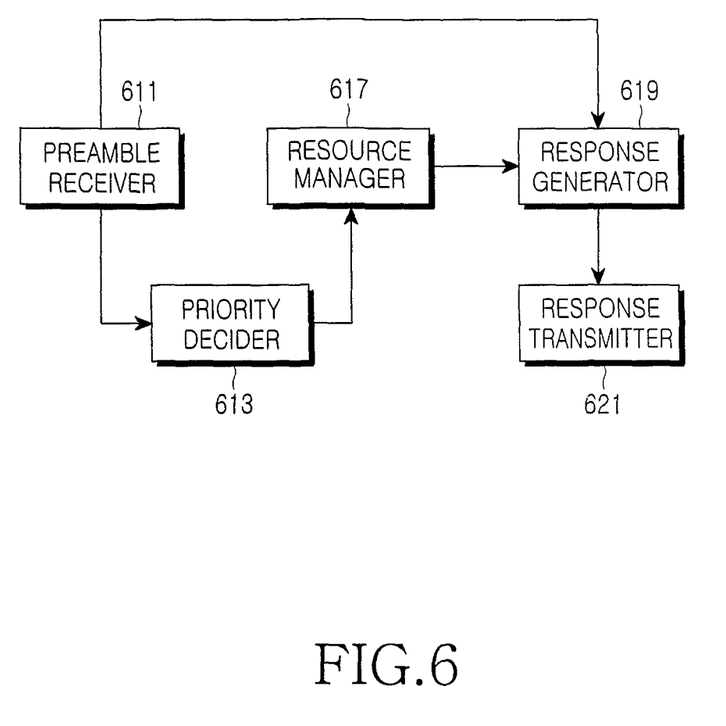
FIG. 6 is a block diagram of an ENB apparatus according to an embodiment of the present invention.

Referring to FIG. 6, a preamble receiver 611 receives an RA Preamble from a UE and provides the RA Preamble to a priority decider 613 and an RA code included in the RA Preamble to a response generator 619. The priority decider 613 determines whether the RA Preamble includes a predetermined RA code and notifies a resource manager 617 of the determination result. If the determination result indicates the presence of the predetermined RA code in the RA Preamble, the resource manager 617 allocates currently available resources of the ENB to the UE and provides resource information indicating the allocated resources to the response generator 619. The response generator 619 generates an RA Preamble including the RA code received from the preamble receiver 611 and the resource information. A response transmitter 621 transmits the RA Response received from the response generator 619 to the UE.

As is apparent from the above description, the present invention advantageously reduces RA contention with other UEs that may occur during an RA procedure when a UE requests setup of a high-priority call and allocates available resources of an ENB to the high priority call of the UE above all other UEs. Therefore, the call can be established rapidly.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A random access method of a mobile station (MS) in a mobile communication system, the method comprising:
    determining, by the MS, upon generation of a call, a priority level of the call;
    generating, by the MS, a preamble using a predetermined random access (RA) code indicating a high-priority call, if the determined priority level is a high priority level;
    transmitting, by the MS, the generated preamble to a base station (BS);
    receiving a response to the preamble from the BS; and
    determining that a random access to the BS is successful, if the response includes the predetermined RA code,
    wherein currently available resources are allocated for the high-priority call in preference to a call of another priority level.

2. A random access method of a base station (BS) in a mobile communication system, the method comprising:
    determining, by the BS, whether a preamble received from a mobile station (MS) includes a predetermined random access (RA) code indicating a high-priority call;
    allocating, by the BS, currently available resources corresponding to the high-priority call in preference to a call of another priority level, if the preamble includes the predetermined RA code; and
    transmitting, by the BS, a response including the predetermined RA code to the MS if the preamble includes the predetermined RA code.

3. The random access method of claim 2, wherein allocation the currently available resources comprises:
    setting a high priority level indication to the predetermined RA code;
    allocating the currently available resources to the MS; and
    generating the response including information about the high priority indication and information about the allocated resources.

4. A random access apparatus of a mobile station (MS) in a mobile communication system, the apparatus comprising:
    a priority decider for, upon generation of a call, deciding a priority level of the call;
    a random access (RA) code selector for selecting a predetermined RA code indicating a high-priority call, if the decided priority level is a high priority level;
    a success/failure decider for determining whether a random access to a base station (BS) is successful;
    a preamble generator for generating a preamble using the predetermined RA code; and
    a transceiver for transmitting the preamble to the BS and for receiving a response to the preamble from the BS,
    wherein currently available resources are allocated for the high priority call in preference to a call of another priority level,
    wherein the priority decider determines whether the response includes the predetermined RA code, and
    wherein the success/failure decider determines that the random access to the BS is successful, if the response includes the predetermined RA code.

5. A random access apparatus of a base station (BS) in a mobile communication system, the apparatus comprising:
    a preamble receiver for receiving a preamble from a mobile station (MS);
    a priority decider for determining whether the preamble includes a predetermined random access (RA) code indicating a high-priority call; and
    a resource manager for allocating currently available resources corresponding to the high-priority call in preference to a call of another priority level, if the preamble includes the predetermined RA code
    wherein the BS transmits a response including the predetermined RA code if the preamble includes the predetermined RA code.

6. The random access apparatus of claim 5, further comprising a response generator for receiving the predetermined RA code included in the received preamble from the preamble receiver, receiving information about the allocated resources from the resource manager, and generating the response including the predetermined RA code and the information about the allocated resources.

* * * * *